United States Patent
Blaukopf et al.

(10) Patent No.: US 8,775,649 B2
(45) Date of Patent: Jul. 8, 2014

(54) OPTIMIZING CLIENT CODE THROUGH AUTOMATED SERVER SPECIALIZATION

(75) Inventors: Daniel Blaukopf, Ra'anana (IL); Dov Zandman, Rosh-Haayin (IL)

(73) Assignee: Oracle America, Inc., Redwood City, CA (US)

( * ) Notice: Subject to any disclaimer, the term of this patent is extended or adjusted under 35 U.S.C. 154(b) by 1230 days.

(21) Appl. No.: 10/303,805

(22) Filed: Nov. 26, 2002

(65) Prior Publication Data
US 2004/0103407 A1 May 27, 2004

(51) Int. Cl.
*G06F 15/16* (2006.01)
*H04L 29/08* (2006.01)
*H04L 29/06* (2006.01)
*G06F 9/44* (2006.01)

(52) U.S. Cl.
CPC ............ *H04L 67/2828* (2013.01); *H04L 69/08* (2013.01); *G06F 8/35* (2013.01)
USPC ............................. 709/230; 709/203; 709/246

(58) Field of Classification Search
CPC ............ H04L 67/2823–67/2828; H04L 67/34; H04L 69/08; H04L 69/18; H04L 69/24; H04L 69/26; G06F 8/35–8/36
USPC .................. 709/203, 230, 246, 249
See application file for complete search history.

(56) References Cited

U.S. PATENT DOCUMENTS

| | | | | |
|---|---|---|---|---|
| 5,675,805 A | * | 10/1997 | Boldo et al. | 717/114 |
| 5,887,172 A | * | 3/1999 | Vasudevan et al. | 719/328 |
| 6,321,274 B1 | * | 11/2001 | Shakib et al. | 719/330 |
| 6,327,606 B1 | * | 12/2001 | Chidambaran | 718/104 |
| 6,697,844 B1 | | 2/2004 | Chan et al. | |
| 6,742,175 B1 | * | 5/2004 | Brassard | 717/107 |
| 7,017,148 B2 | | 3/2006 | Kumar | |
| 7,055,143 B2 | | 5/2006 | Ringseth et al. | |
| 7,096,419 B2 | | 8/2006 | Barnes et al. | |
| 2002/0087729 A1 | * | 7/2002 | Edgar | 709/246 |
| 2002/0184610 A1 | | 12/2002 | Chong et al. | |
| 2003/0009539 A1 | * | 1/2003 | Hattori | 709/219 |
| 2003/0050932 A1 | | 3/2003 | Pace et al. | |
| 2003/0093551 A1 | * | 5/2003 | Taylor et al. | 709/237 |
| 2004/0064503 A1 | * | 4/2004 | Karakashian et al. | 709/203 |

OTHER PUBLICATIONS

Jing, et al. "Client-Server Computing in Mobile Environments", Jun. 1999, ACM Computing Surveys, vol. 31, No. 2, pp. 117-157.*
Sarkar, et al, Code generation using XML based document transformation, The server Side : Nov. 2001, pp. 1-20.

* cited by examiner

*Primary Examiner* — Patrice Winder
*Assistant Examiner* — Julian Chang
(74) *Attorney, Agent, or Firm* — Marsh Fischmann & Breyfogle LLP

(57) ABSTRACT

Improved end-to-end server-client communication is achieved, wherein a thin client requests services from a server using a condensed optimized protocol. A mediator is provided on the server, which translates encoded messages from the client into standard web service request formats. Results are re-encoded at the server and returned to the client. A code generator is provided to automatically create optimized and specialized client and server code using templates, in which the code is optimized according to the characteristics of the client and the specified services. Grouped messages are supported. Bandwidth consumption is reduced by the technique, which increases the performance of resource-constrained clients, such as small wireless devices.

57 Claims, 4 Drawing Sheets

OPTIMIZING CLIENT CODE THROUGH AUTOMATED SERVER SPECIALIZATION

BACKGROUND OF THE INVENTION

1. Field of the Invention

This invention relates to improvements in end-to-end communication between a client and a server. More particularly, this invention relates to apparatus and methods for minimizing the resources used by a resource-constrained client, when accessing services provided by a server.

2. Description of the Related Art

The meanings of acronyms and certain terminology used herein are given in Table 1. The terms Sun, Sun Microsystems, the Sun logo, Java, J2EE, J2ME, and J2SE are trademarks or registered trademarks of Sun Microsystems, Inc., in the United States of America and other countries. All other company and product names may be trademarks of their respective companies.

TABLE 1

| | |
|---|---|
| API | Application Programming Interface |
| HTTP | Hypertext transfer protocol |
| J2EE | Java 2 Enterprise Edition |
| J2ME | Java 2 Micro Edition |
| J2SE | Java 2 Standard Edition |
| MIDP | Mobile information device profile |
| SOAP | Simple Object Access Protocol |
| WSDL | Web Service Description Language |
| XML | Extended Markup Language |

When developing end-to-end applications for thin clients, such as mobile information devices, it is important that the client code for communicating with a server be as compact and efficient as possible, and that traffic between the client and server be minimized when requesting services or resources of the server. This is desirable, because the client's resources are generally limited. Some clients have small memory capacity and limited graphics capabilities. Other clients may need to minimize computation in order to avoid depleting battery power, or to improve the responsiveness of an application. Furthermore, in the current state of the art, network bandwidth limitations and latency can severely limit the utility of thin clients.

J2EE and J2ME are widely used platform-independent technologies, which are used respectively for multi-tier enterprise applications and low-end clients, such as mobile information devices, smart cards, and mobile telephones. The two technologies are not well integrated, and it is not convenient or practical for a J2ME client to directly access J2EE services on a server. Known solutions designed for J2SE/J2EE integration do not scale down to the low processing power and network bandwidth of J2ME devices. As a result, developers are often compelled to spend a great deal of engineering effort developing and debugging protocols for wireless communication.

One widely used protocol for accessing remote services is SOAP, which specifies how to encode and transmit method invocations and responses using HTTP and XML. SOAP is commonly used in conjunction with WSDL, a language for declaring web services. J2ME clients are currently able to access web services using SOAP in several ways.

An extensible open-source API, kSOAP, available from Enhydra.org, is usable by a MIDP application for accessing a subset of SOAP services. This is a solution for MIDlets that need to communicate directly with the server, or require flexibility. However, its memory footprint of 34 Kbytes is currently too large for most MIDP devices.

Another API, kXML-RPC, is an open-source J2ME implementation of the protocol XML-RPC, available from Enhydra.org. This API is used for cross-platform remote procedure calls. XML-RPC is similar to SOAP, but is a more concise protocol. Less network bandwidth and processing power are required to transport and parse messages. XML-RPC is less generic, and less widely supported than SOAP.

A distributed objects framework, YoCOA, is available from Yospace, 7, The Courtyard High Street, Staines, Middlesex, TW18 4DR, UK. YoCOA is a proprietary set of J2ME and J2EE tools and libraries for facilitating end-to-end development. YoCOA provides remote procedure calls to appropriately enabled J2EE services.

The software product Macrospace Connect, available from Macrospace Ltd., 64 Knightsbridge, London, SW1X 7JF, UK, is another proprietary set of tools and libraries for facilitating end-to-end development.

Merely customizing a development tool to work optimally with SOAP and WSDL is not a good general solution for end-to-end communication, as there are many existing server configurations in which the services provided are neither expressed in WSDL nor accessed by SOAP.

Conventionally, optimization of the client code is accomplished by manual code adjustment. This technique is cumbersome and labor intensive. Many different optimizations may be required for use with different mobile information devices. Reliance on manual optimization can compel an application developer to dedicate expensive staff to the task of accommodating new models and types of mobile information device. Thus, improving manual optimization techniques would seem to be an unpromising approach.

It is known to restrict access to software by a client by various code obfuscation techniques in order to prevent reverse-engineering of software, when using languages such as Java, which was designed to be compiled into a platform independent bytecode format. However, these techniques are of limited utility in minimizing an application's code size.

SUMMARY OF THE INVENTION

According to some aspects of the invention, MIDP devices employing J2ME technology are enabled to conveniently and efficiently access J2EE services that are provided over a data network, such as the Internet. The approach taken is to use as thin a client as possible, diverting as much processing as possible to the server and as much code development as possible to an automated tool.

In some aspects of the present invention the problem of client code optimization is solved by a technique, wherein a developer prepares an application for a resource-constrained client, such as a mobile information device, in which he specifies services to be exported to the client from server-side providers. A development tool incorporating a template-driven code generator is invoked to automatically create specialized client and server code, optimized for the specified services. Use of an optimized protocol allows client code to be minimized through elimination of redundant code, and by using code optimizations that can be automatically selected by the code generator. The server code consists of a mediator that acts as a gateway between the client and providers of the specified services, translating the optimized protocol into a standard protocol that is expected by the providers. The server-side providers thus see a conventional client, and need not modify their standard procedures in any way in order to receive requests from such low-end clients.

In some embodiments, the code generator is aware of the characteristics of the client, which knowledge is exploited for even greater code optimization. For example, the code generator may also select from among different implementations of a method in order to produce a minimal code size. The results are superior to those that could be obtained by an optimizing compiler or code obfuscation engine.

An advantage of some aspects of the present invention is minimization of the computational load on the client by automatically and optimally distributing the computation between the client and the server.

A further advantage of some aspects of the present invention is the reduction of required network bandwidth, by providing a specially adapted, concise low-noise protocol to be used between the client and the mediator. The mediator retains the ability to communicate with the service endpoint using a conventional protocol.

Still another advantage of some aspects of the present invention is enhanced system performance and reduced client code footprint, when compared with conventional techniques such as code obfuscation.

The invention provides a method of communication between a client operating in a first platform-independent environment to a server operating in a second platform-independent environment in order to obtain a service for the client via the server, which is carried out by compiling a program for the client from platform-independent source code, using the program to generate a request for the service by the client, encoding the request at the client according to a first format to define an encoded message, and transmitting the encoded message to a mediator. The method is further carried out at the mediator by re-encoding the encoded message into a second format, wherein the size of the re-encoded message exceeds the size of the encoded message, and transmitting the re-encoded message to a provider of the service.

According an aspect of the method, the program has only the minimum code that is required to produce the first format.

In still another aspect of the method re-encoding the encoded message is performed by decoding the encoded message, and re-encoding the decoded message into the second format.

According to an additional aspect of the method, the request includes a plurality of requests that are assembled into an encoded message group in the encoded message.

One aspect of the method includes delaying performance of encoding the request for a latency interval to await pendency of additional ones of the plurality of requests.

According to a further aspect of the method, the plurality of requests are asynchronously initiated.

According to another aspect of the method, the second format is SOAP.

The invention provides a method of establishing access by a client to predetermined server-side services, which is carried out by installing proxy code in the client to provide an interface with an application program executing therein, wherein requests for the server-side services are generated by the application program, and the proxy code is adapted to reformulate the requests as first messages according to a first protocol. The method is further carried out by executing a mediator program in a computing device external to the client, wherein the mediator program accepts input from the client according to the first protocol, and is adapted to reformulate the first messages as second messages according to a second protocol. The computing device is capable of communicating the second messages to a provider of the server-side services.

According to an aspect of the method, the first messages are smaller than corresponding second messages.

According to still another aspect of the method, the first messages each comprise a plurality of requests.

In an additional aspect of the method, installing proxy code includes automatically generating the proxy code, substantially without human intervention.

In another aspect of the method, generating the proxy code is performed according to a predefined template.

In one aspect of the method, executing the mediator program includes automatically generating the mediator program, substantially without human intervention.

In another aspect of the method, generating the mediator program is performed according to a predefined template.

According to another aspect of the method, the second protocol is SOAP.

A further aspect of the method includes installing an API in the client for access by the application program.

According to yet another aspect of the method, the proxy code includes a synchronous stub.

According to still another aspect of the method, the proxy code includes an asynchronous stub.

According to an additional aspect of the method, the proxy code includes a grouped stub.

According to one aspect of the method, the proxy code includes instructions for enablement of HTTP for transport of the first messages.

According to another aspect of the method, the proxy code includes instructions for enablement of HTTPS for transport of the first messages.

According to a further aspect of the method, the proxy code includes no more than one procedure for accessing the server-side services.

According to another aspect of the method, the proxy code includes a plurality of Java classes.

The invention provides a method of communication between a client operating in a first platform-independent environment and a server operating in a second platform-independent environment over a data network to obtain a supported service for the client via the server, which is carried out at the client by encoding a request for the service according to a first format to define an encoded message, and transmitting the encoded message to a mediator via the data network. The method is further carried out at the mediator by re-encoding the encoded message into a second format to define a re-encoded message, wherein the size of the re-encoded message exceeds the size of the encoded message, and transmitting the re-encoded message to a provider of the service via the data network.

The invention provides A computer software product, comprising a computer-readable medium in which computer program instructions are stored, which instructions, when read by a computer, cause the computer to perform a method for enabling communication between a client operating in a first platform-independent environment and a server operating in a second platform-independent environment to obtain a service for the client via the server, which is carried out at the client by encoding a request for the service according to a first format to define an encoded message, and transmitting the encoded message to a mediator. The method is further carried out at the mediator by re-encoding the encoded message into a second format, wherein the size of the re-encoded message exceeds the size of the encoded message, and transmitting the re-encoded message to a provider of the service.

The invention provides a computer software product, including a computer-readable medium in which computer program instructions are stored, which instructions, when read by a computer, cause the computer to perform a method of establishing access by a client operating in a first platform-independent environment to a server operating in a second platform-independent environment to obtain predetermined server-side services, which is carried out by generating proxy code for installation in the client to provide an interface with an application program executing therein, wherein requests for the server-side services are generated by the application program, and the proxy code is adapted to reformulate the requests as first messages according to a first protocol, and generating a mediator program for installation in a computing device external to the client. The mediator program accepts input from the client according to the first protocol, and is further adapted to reformulate the first messages as second messages according to a second protocol. The computing device is capable of communicating the second messages to a provider of the server-side services.

The invention provides a computer software product, including a computer-readable medium in which computer program instructions are stored, which instructions, when read by a computer, cause the computer to perform a method of establishing an interaction between a client operating in a first platform-independent environment to a server operating in a second platform-independent environment over a data network to obtain a supported service for the client via the server, which is carried out by generating a first program for installation in the client, which when executed by the client causes the client to encode a request for the service according to a first format to define an encoded message, and to transmit the encoded message to the server via the data network. The method is further carried out by generating a second program for installation in the server, which when executed by the server causes the server to re-encode the encoded message into a second format, wherein the size of the re-encoded message exceeds the size of the encoded message, and to transmit the re-encoded message to a provider of the service via the data network.

The invention provides a development system for establishing access by a client to predetermined server-side services, including a computer having a code generator executing therein in a first platform-independent environment. The code generator is adapted to generate proxy code executable in the client to provide an interface with an application program executing in the client, wherein requests for the server-side services, are generated by the application program. The proxy code is adapted to reformulate the requests as first messages according to a first protocol. The client operates in a second platform-independent environment, and the code generator is further adapted to generate a mediator program for a computing device external to the client, the mediator program accepting input from the client according to the first protocol and being further adapted to reformulate the first messages as second messages according to a second protocol. The computing device is capable of communicating the second messages to a provider of the server-side services.

According to a further aspect of the development system, the code generator is actuated using a command line interface.

According to yet another aspect of the development system, the code generator is linked to an integrated development program.

According to still another aspect of the development system, the provider of the server-side services is a Java-enabled server.

According to an additional aspect of the development system, the client is a Java-enabled client.

According to one aspect of the development system, the mediator program is compiled from Java source code by the code generator.

According to one aspect of the development system, the first messages are smaller than corresponding ones of the second messages.

According to an additional aspect of the development system, the first messages each comprise a plurality of the requests.

According to still another aspect of the development system, an input of the code generator includes a predefined template.

According to another aspect of the development system, the template includes Java source code, wherein at least a part of the Java source code is copied by the code generator to an output file.

According to a further aspect of the development system, the template also includes a logical directive that specifies the part of the Java source code.

According to yet another aspect of the development system, the mediator program is generated by the code generator responsively to the template.

According to a further aspect of the development system, the second protocol is SOAP.

According to yet another aspect of the development system, the proxy code includes proxy classes.

According to another aspect of the development system, the proxy code includes a synchronous stub.

According to one aspect of the development system, the proxy code includes an asynchronous stub.

According to an additional aspect of the development system, the proxy code includes a grouped stub.

According to still another aspect of the development system, the proxy code includes instructions for enablement of HTTP for transport of the first messages.

According to yet another aspect of the development system, the proxy code includes instructions for enablement of HTTPS for transport of the first messages.

According to a further aspect of the development system, the proxy code includes no more than one procedure for accessing the server-side services.

BRIEF DESCRIPTION OF THE DRAWINGS

For a better understanding of these and other objects of the present invention, reference is made to the detailed description of the invention, by way of example, which is to be read in conjunction with the following drawings, wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

Architecture.

Figure 1:
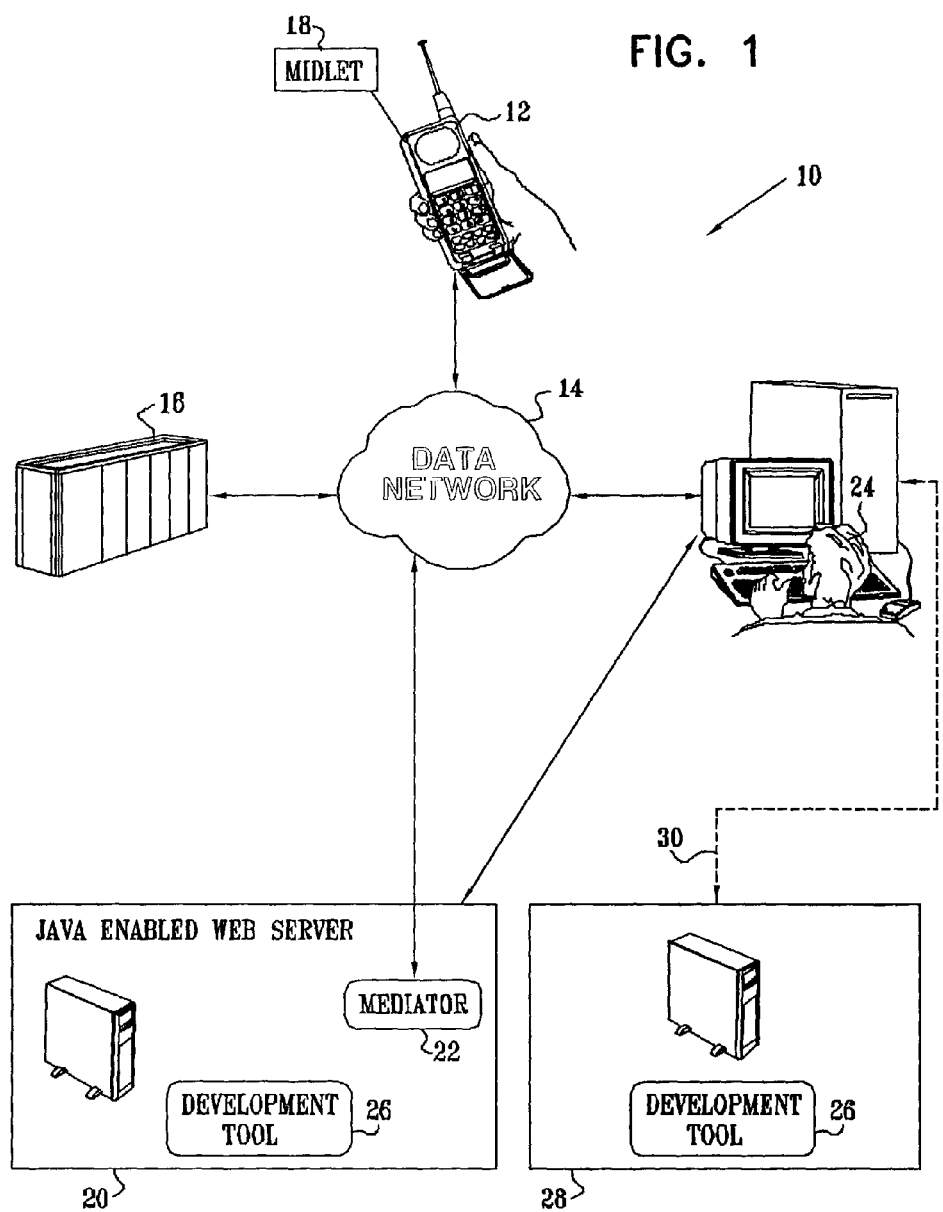
FIG. 1 is a block diagram of a system for providing end-to-end communication between a client and a server that is constructed and operative in accordance with a disclosed embodiment of the invention.

Reference is now made to FIG. 1, which is a block diagram of a system 10 for providing end-to-end communication between a client and a server that is constructed and operative in accordance with a disclosed embodiment of the invention. A resource-constrained client, operating in a platform-independent environment designed for small clients, represented by a mobile information device 12, is connected to a data network 14, which can be the Internet. The mobile information device 12 is typically a J2ME client. An application or content server 16 operates in a platform-independent environment designed for devices having greater capabilities than the mobile information device 12. The server 16 is typically a J2EE-enabled server operated by a content provider or a service provider, and is connected to the data network 14. A specialized MIDlet 18 executing on the mobile information device 12 requests desired services or content from the server 16. The system 10 includes a gateway server 20 that is connected to the data network 14. A mediator servlet 22 resides on the server 20, and acts as a gateway between the mobile information device 12 and the server 16. Thus, unlike conventional data network communication, data does not always flow directly between the mobile information device 12 and the server 16, as will be explained in further detail hereinbelow. Alternatively, the mediator servlet 22 may reside on the server 16 together with the server application software.

The mediator servlet 22 is typically generated by a developer 24, in conjunction with the development of the MIDlet 18. In some embodiments the mediator servlet 22, or a replica thereof (not shown), may be accessible to the developer 24 via the server 20 across the data network 14. Additionally or alternatively, the developer 24 could access the mediator servlet 22 via a direct link to the server 20. In either case, the developer 24 is able, using a development tool 26 in the server 20, to optimize the MIDlet 18 according to the particular content or services being sought from the server 16, and the characteristics of the mobile information device 12. Alternatively, the development tool 26 may be located in a different development machine 28, as indicated by a dotted line 30.

Figure 2:
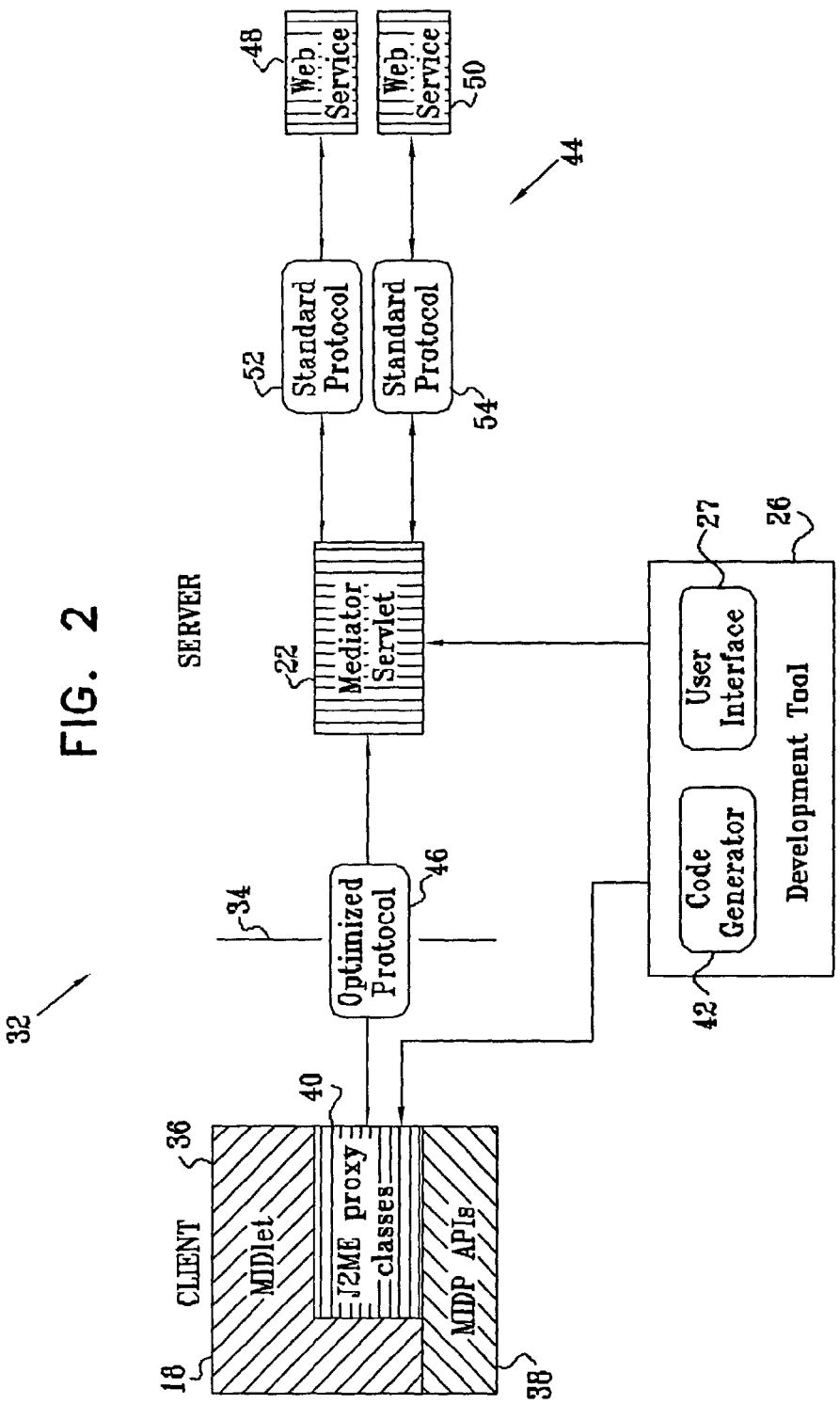
FIG. 2 is a block diagram of a system for developing specialized client and server software for a MIDP device that requires J2EE services in accordance with a disclosed embodiment of the invention.

Reference is now made to FIG. 2, which is a block diagram of an arrangement 32 for developing specialized client and server software for use by a MIDP device, such as a J2ME-enabled mobile information device, that requires J2EE services in accordance with a disclosed embodiment of the invention. The disclosure of FIG. 2 should be read in conjunction with FIG. 1, in which like elements are given like reference numerals. Portions of the arrangement 32 may be incorporated within the mediator servlet 22 (FIG. 1), or may reside on a separate development platform. The arrangement 32 generally conforms to a client-server model, in which a client-server division is indicated by a vertical line 34. A J2ME client 36 has the MIDlet 18 installed therein. The code of the MIDlet 18 is typically written by the developer 24 (FIG. 1). An API set 38, consisting of one or more conventional MIDP API's, is installed in the client 36. For example, the API set 38 could include the J2ME Mobile Media API, which provides audio, video and other time-based multimedia support to resource-constrained devices, and allows the developer 24 to gain access to native multimedia services available on the client 36.

J2ME proxy classes 40 are included in the MIDlet 18 that is installed in the client 36, which enables it to access web services. The proxy classes 40 are automatically generated by the development tool 26, based on definitions of web services and preferences supplied by the developer 24 (FIG. 1). A code generator 42 is provided in the development tool 26. In some embodiments, the developer 24 accesses the development tool 26 interactively, using a graphical user interface 27. In other embodiments, the developer 24 non-interactively submits information, for example parameters, to the development tool 26.

A mediator server 44 is generally indicated on the right side of the arrangement 32. The server-side mediator servlet 22 interacts with the proxy classes 40 through a customized and optimized protocol 46, optimized for low network bandwidth and easy parsing. The mediator servlet 22 is automatically generated by the development tool 26. The mediator servlet 22 interprets web service requests from the client 36 and delivers them to appropriate providers of web services 48, 50 using a standard protocol 52, which can be SOAP, or another standard protocol 54. The web services 48, 50 may be hosted on the same or a different server as the mediator server 44. When the mediator servlet 22 receives responses from the web services 48, 50, it relays them back to the client 36 using the optimized protocol 46, or a different optimized protocol. The web services 48, 50 may be created by the developer 24 (FIG. 1), or by another developer (not shown).

Proxy Classes.

With continued reference to FIG. 1 and FIG. 2, the proxy classes 40 (FIG. 2) contain as simple an interface as possible. Thus, from the perspective of the developer 24 (FIG. 1), developing code using an API provided by a web service is hardly different from developing code using a local API. For example, a web service providing the API shown in Listing 1 may be represented on the client 36 by the code shown in Listing 2.

Listing 1

```
public class HelloService {
public String sayHello(String name) {
return "Hello" + name + "!"
}
}
```

Listing 2

```
public class HelloServiceProxy {
public String sayHello(String name) throws
```

-continued

```
    IOException {
    // code to communicate with the service
    // via the mediator
    // and return the result
    }
}
```

The MIDlet 18 could call the service of Listing 2 using a synchronous call, as shown in Listing 3.

Listing 3

```
String              server              =
    http://www.example.com/services/mediator";
HelloService service = new HelloServiceProxy(server);
try {
String greeting = service.sayHello("World");
} catch (IOException ioe) {
// exception handling
}
```

Client Agent.

Referring again to FIG. 1 and FIG. 2, the client 36 preferably has minimum memory requirements, both in terms of static footprint and of heap memory requirements. At the present time, in order to be acceptable to developers, it is recommended that no more than 15 Kbytes be preempted by the client 36.

There are other general considerations in the design of the MIDlet 18 and the proxy classes 40. It is desirable that a minimum amount of processing occurs in the client 36. Since mobile information devices typically have low network bandwidth and high latency, the client agent should generate a minimum amount of network traffic.

As noted above, asynchronous calls to web services are supported in the proxy classes 40, and as the HTTP protocol is an essential network protocol for MIDP devices, it is well supported. The client agent also supports the HTTPS protocol, and can be adapted to support all protocols supported by MIDP, Version 1.0, and is sufficiently flexible to support many other any protocols, limited only by the capabilities of the client 36.

Client Protocol.

With continued reference to FIG. 1 and FIG. 2, the optimized protocol 46 used by the proxy classes 40 for communication with the mediator servlet 22 is configured according to the characteristics of the API set 38. Thus, asynchronous requests may be grouped together into a single request to improve efficiency. This may be achieved by adding an artificial latency for example, 100 ms., after a request, during which time any additional requests are bundled together with the first request.

Server Protocols.

With continued reference to FIG. 1 and FIG. 2, the mediator servlet 22 uses SOAP as the standard protocol 52 for communicating with services, for example the web services 48, which must be SOAP enabled web services.

It will be understood that while the web services 48, 50 are shown in FIG. 2, the mediator servlet 22 is not limited to communicating with web services, nor to SOAP, or even the use of the HTTP protocol. The mediator servlet 22 can communicate with many remote services. For those remote services that use non-standard protocols, the developer 24 (FIG. 1) must provide classes (not shown) for communication between the mediator servlet 22 and the remote services using the remote services' respective protocols. The mediator servlet 22 calls a developer-provided class in order to effect the communication. Although only two standard protocols 52, 54 are illustrated representatively in FIG. 2, many different standard and non-standard protocols can be used in accordance with the requirements of different web services. Indeed, virtually all non-standard custom protocols can be used, so long as the developer 24 (FIG. 1) is aware of their specifications, so that an appropriate class can be included in the mediator servlet 22.

Code Generation Tool.

With continued reference to FIG. 1 and FIG. 2, the mediator servlet 22 is built automatically by the development tool 26. It acts as a translator between the optimized protocol 46 and the standard protocols 52, 54. The code generator 42 generates Java source code for the proxy classes 40 and the mediator servlet 22. Optionally, the generation of the proxy classes 40 and the mediator servlet 22 includes a specification of the network transport on which communication occurs, for example, HTTP, HTTPS, SMS, socket or secure socket. The code generator 42 recognizes a directive to, generate debugging classes with tracing statements, and a directive to generate optimized classes for deployment as the proxy classes 40.

Details of web services are obtained by the development tool 26 in two ways. For web services that are defined in WSDL, all necessary information can be obtained from the WSDL definitions and the location of the web service. For other J2EE services, the developer 24 (FIG. 1) must provide details of the service in the form of a Java interface and the name of an implementing class to the development tool 26.

The code generator 42 may be implemented using the Sun ONE Studio integrated development environment, available from Sun Microsystems, Inc. Alternatively, the code generator 42 may have a command-line interface, or can be provided with a Java API. Alternatively, the code generator 42 can be implemented as a stand-alone tool, having its own user interface.

Figure 3:
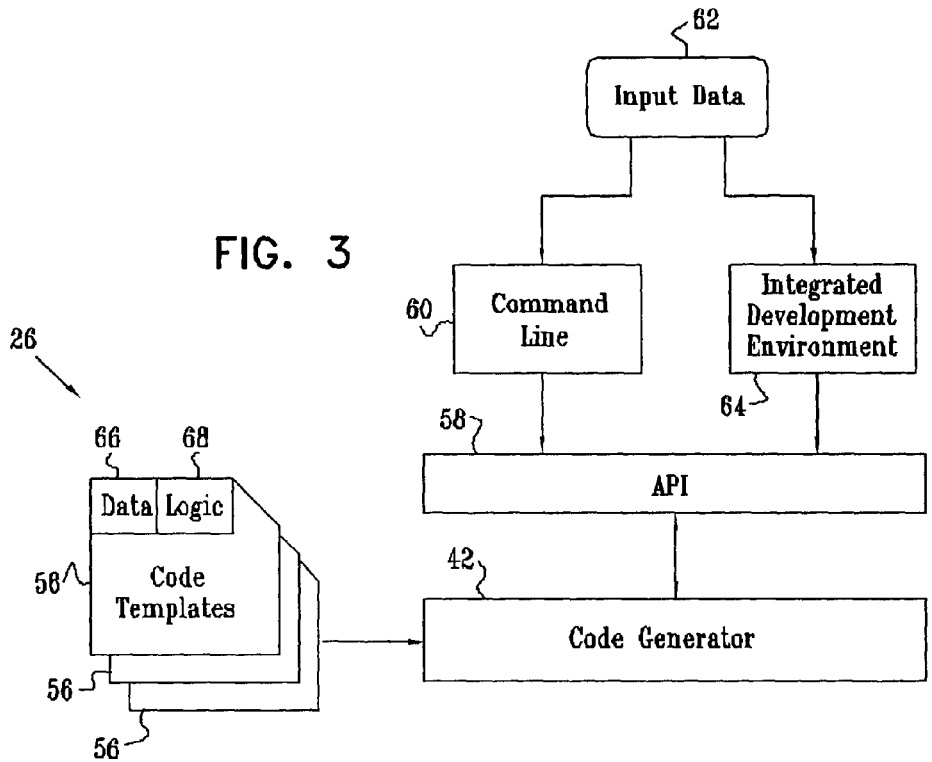
FIG. 3 is a detailed block diagram of a development tool in the system shown in FIG. 2 in accordance with a disclosed embodiment of the invention.

Reference is now made to FIG. 3, which is a detailed block diagram of the development tool 26 (FIG. 2) in accordance with a disclosed embodiment of the invention. The description of FIG. 3 should be read in conjunction with FIG. 2, in which like elements are given like reference numerals. The code generator 42 can be regarded as the core of the development tool 26. It employs code templates 56 in order to create the proxy classes 40 and the mediator servlet 22 (FIG. 2). The code generator 42 is accessible via an internal API 58 using a command line interface 60 to supply input data 62 that enables the code generator 42 to parameterize the code that it produces. Alternatively, an integrated development environment 64, for example, the Sun ONE Studio, may be linked to the API 58 in order to control the code generator 42.

The input data 62 supplied to the code generator 42, either via the command line interface 60 or the integrated development environment 64, include the names of classes and methods to be exported by the server to the client, details of what output files are to be generated, and where they are to be placed. The input data 62 further include a feature set that is to be supported by the generated client code. Options within the feature set include dynamic invocation, synchronous stubs, asynchronous stubs, grouped stubs, and enablement of HTTP or HTTPS as the underlying network protocol.

If the dynamic invocation option is elected, the client code includes a single method with a name such as invokeServer( ), which is used to access all functions of the server.

If the synchronous stubs option is elected, then each method exported from the server to the client has a corresponding method on the client for accessing the server, which does not return control to the calling application until the call to the server has completed.

If the asynchronous stubs option is elected, then each method exported from the server to the client has its own method on the client, which calls the server and returns control to the calling application immediately. Results from the call are retrieved through an interface using the listener model.

If the grouped stubs option is elected, then each method exported from the server to the client has its own method on the client. This method prepares a call to the server but does not actually call it until yet another method, here termed syncGroup( ), is called. Using this mechanism, multiple calls to methods on the server can be made using a single HTTP or HTTPS connection.

The code generator 42 loads one or more of the code templates 56 in preparation for generating its output. Each of the code templates 56 is a blueprint for the code to be generated. It contains two interleaved parts, data 66, and logic 68. The data 66 consists of Java source code, which is to be copied verbatim to output files. The logic 68 is typically Java byte code, (e.g., J2ME proxy classes and their infrastructure) that is executed during code generation to control what parts of the data 66 are to be copied to the mediator servlet 22. For example, the logic 68 in one of the code templates 56 may ensure that data 66 that contains code to support grouped calls, or to handle receiving arrays of strings from the server, is only included if there is an explicit user requirement for such functionality, or an implicit requirement that can be inferred from the configuration data. By appropriately configuring the data 66 and the logic 68, the code templates 56 relieves the developer 24 (FIG. 1) of much of the burden of providing detailed code. Code templates can be provided for many different products that can function as the mobile information device 12 (FIG. 1), Similarly, different code templates can be prepared for different web services. As the clients and web services encountered today are so diverse, it is likely that large catalogs of code templates 56 will be maintained for use by the code generator 42. The output of the code generator 42, and the optimized protocol 46 (FIG. 2) is influenced by the input data 62, in which the developer 24 (FIG. 1) specifies the protocol with which the mediator servlet 22 is to communicate with the remote service. As mentioned above, the developer 24 has wide latitude to select a standard or a non-standard protocol.

When the code templates 56 are used to generate source code for the client and the server, they are parameterized with the input data 62 that were supplied via the command line interface 60 or the integrated development environment 64.

Included in the logic 68 is code that specializes the optimized protocol 46 (FIG. 2). When the mediator servlet 22 on the mediator server 44 receives a call from the client 36, it needs to determine which method of the requested service is to be invoked. The client 36 sends it an integer identification code identifying the requested method. This identification code is fixed at the time the proxy classes 40 and the mediator servlet 22 are generated by the development tool 26.

EXAMPLE 1

This example is presented with continued reference to FIG. 2 and FIG. 3. A class StockService on a server offering the web services 48 has three methods by which particular services can be supplied to the client 36: getStockTickers( ), getStockName( ), and getStockValue( ). Each of these three methods is assigned a unique integer identification code.

When the client 36 invokes one of these methods from the web services 48, it transmits a message to the mediator servlet 22 using the following 3-part protocol: (1) an integer code indicating that a command is about to be sent; (2) the identification code integer identifying the requested method; and (3) the parameters of the requested method. The 3-part protocol is specified by the developer 24 (FIG. 1), who also specifies which methods are allowed to be called from the client 36. Any unneeded functionality is intentionally omitted from the 3-part protocol by the development tool 26 at code generation time.

Assume that the client 36 is a stock tracking MIDlet. First, it queries the web services 48 to get the list of stock tickers for which it can provide data.

The client 36 sends a request as shown in Listing 4 to the mediator servlet 22, and waits for a response, which it expects to be a list of text strings. The mediator servlet 22 receives the request and sends a SOAP request to the server hosting the web services 48, as shown in Listing 5.

Listing 4

(32-bit integer): 1 (code for a remote service request)
(32-bit integer): 1 (one element in this request)
(32-bit integer): 5 (code for "getStockTickers" service)

Listing 5

<?xml version='1.0' encoding='UTF-8'?>
<SOAP-ENV:Envelope xmlns:SOAP-ENV="http:
// schemas.xmlsoap.org/soap/envelope/"
xmlns:xsi="http://www.w3.org/1999/XMLSchema-instance"
xmlns:xsd="http://www.w3.org/1999/XMLSchema">
<SOAP-ENV:Body>
etc.

The mediator servlet 22 receives a SOAP response, as shown in Listing 6.

Listing 6

<?xml version='1.0' encoding='UTF-8'?>
<SOAP-ENV:Envelope
xmlns:SOAP-
ENV="http://schemas.xmlsoap.org/soap/envelope/"
xmlns:xsi="http://www.w3.org/1999/XMLSchema-instance"
    xmlns:xsd="http://www.w3.org/1999/XMLSchema">
<SOAP-ENV:Body>
etc.

The SOAP response contains a list of supported stock tickers (say "SUNW", "IBM" and "MSFT"), which the mediator servlet 22 relays to the waiting client 36, as shown in Listing 7.

Listing 7

(32-bit integer): 1 (code for successful operation)
(32-bit integer): 3 (three elements in string array)
(32-bit integer): 4 (four bytes in first string)
SUNW
(32-bit integer): 3 (four bytes in second string)
IBM
(32-bit integer): 4 (four bytes in first string)
MSFT The client 36 receives this data and then closes the connection to the mediator servlet 22. The client 36 now wants to get the full business names for the stickers "SUNW" and "IBM".

It sends a grouped request to the mediator servlet 22, as shown in Listing 8, and waits for a response.

---
Listing 8
---

(32-bit integer): 1 (code for a remote service request)
(32-bit integer): 2 (two elements in this request)
(32-bit integer): 8 (code for "getStockName" service)
(32-bit integer): 4 (number of bytes in string about to be sent)
SUNW
(32-bit integer): 8 (code for "getStockName" service)
(32-bit integer): 3 (number of bytes in string about to be sent)
IBM

---

The mediator servlet 22 receives this grouped request, which in this example is a pair of requests. For each request in turn, the mediator servlet 22 composes and sends a SOAP request to a remote service to receive the company names for the stock ticker, which may be the same or a different service than the web services 48. The mediator servlet 22 then receives the SOAP response and extracts critical information. The mediator servlet 22 then returns this information to the waiting client 36, as shown in Listing 9.

---
Listing 9
---

(32-bit integer): 1 (code for successful operation)
(32-bit integer): 22 (twenty-two elements in string array)
Sun Microsystems, Inc.
(32-bit integer) 1 (code for successful operation)
(32-bit integer): 44 (forty-four elements in string array)
International Business Machines Corporation

---

The client 36 receives the response shown in Listing 9, and disconnects from the mediator servlet 22.

Client Code Size Reduction.

As shown in Example 1, and with continued reference to FIG. 2 and FIG. 3, the code generator 42 is constructed to exclude unused and unneeded code from the proxy classes 40 and the mediator servlet 22. The logic 68 in the code templates 56 (FIG. 3) ensures that only code for required features and data types is generated by the code generator 42. For example, if no Boolean value is ever returned by the web services 48, 50, the client 36 is not provided any code for dealing with Boolean return values.

Client Code Optimization.

Continuing to refer to FIG. 2 and FIG. 3, in addition to simply not generating code for unneeded features, the code generator 42 can apply other optimizations based on its intimate knowledge of the exact requirements specified by the developer 24 (FIG. 1). The following optimizations are examples.

The code generator 42 may generate inline code for methods that are used only once or twice, and generate invokable method code for methods that are called more frequently.

The code generator 42 may evaluate more than one algorithm for the client source code, and employ the one most appropriate to the balance of stub methods that are generated, in accordance with the logic 68 in the code templates 56. For example, if there are only a few synchronous stubs to be generated, then the logic 68 may recognize that code space can be conserved by generating stub code that writes directly to a HTTP, or HTTPS output stream, instead of using a default generic mechanism.

Operation.

Figure 4:
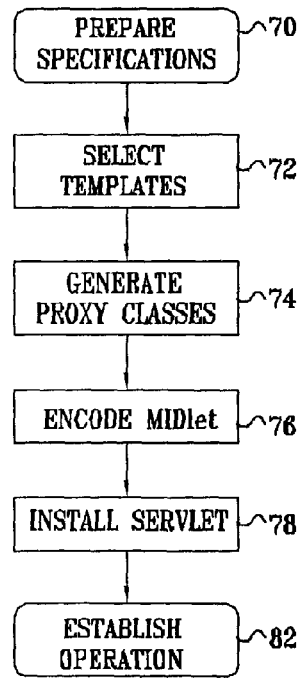
FIG. 4 is a flow chart indicating a method of preparing specialized software to enable a client to access a server to obtain web services in accordance with a disclosed embodiment of the invention.

Reference is now made to FIG. 4, which is a flow chart indicating a method of preparing specialized software to enable a client to access a server to obtain remote services in accordance with a disclosed embodiment of the invention. The process begins at initial step 70, wherein software specifications are prepared. Here a developer specifies which remote services are intended to be accessed by the client.

Next, at step 72, input data, typically parameters, are introduced at this time, for use by the code templates as parameters during code generation. A development tool is typically employed at this step, as disclosed hereinabove. Code templates appropriate to the particular client and most closely adapted to the desired remote services are automatically selected and loaded by a code generator.

Next, at step 74, proxy classes are generated by the developer, using a development tool. Included in the proxy classes are classes having methods that invoke desired remote services. The methods encrypt requests for remote services into a form that is more compact than requests produced by the API's that were installed in step 74. One or more of such requests is then incorporated into a transmission package in accordance with a specified optimized protocol. Other methods deal with receipt of encoded data and their decoding into conventional data formats.

Next, at step 76 a MIDlet is encoded by the developer, and installed in the client. The MIDlet is dependent on the proxy classes, which were generated at step 74. Typically, an emulator is used to develop the MIDlet. The remote services to be accessed by the MIDlet correspond to the remote services that are dealt with by the code templates that were selected at step 72. Typically, the MIDlet code employs calls made available by the API's that were installed in step 74.

Next, at step 78 a mediator servlet is generated and installed on a server. The mediator servlet is configured to use the optimized protocol, and to translate encrypted information into invocations of requested remote services using a standard protocol, for example SOAP. The mediator servlet is also constructed to perform an inverse operation, wherein results received as a result of requests for remote services are encrypted into the same or a different optimized protocol for retransmission to the client.

At final step 82 network connections are established, and the client-server system can be placed into operation.

Figure 5:
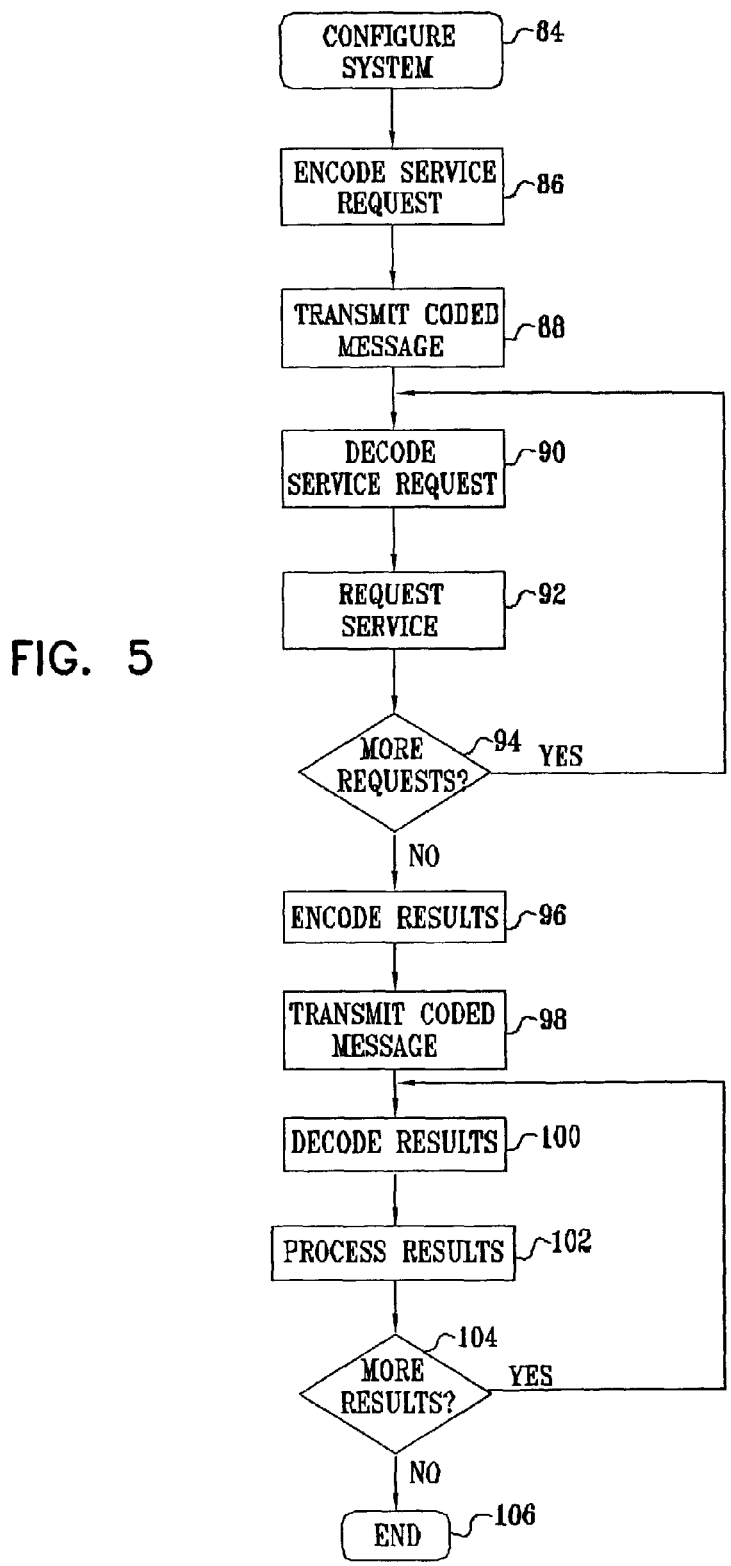
FIG. 5 is a flow chart illustrating a method of using an optimized protocol in a client-server end-to-end communication in accordance with a disclosed embodiment of the invention.

Reference is now made to FIG. 5, which is a flow chart illustrating a method of using an optimized protocol in client-server end-to-end communication in accordance with a disclosed embodiment of the invention. The process begins at initial step 84, where a client and a server are configured using the procedure set forth in FIG. 4. The process steps are shown in a particular sequence in FIG. 5 for clarity of presentation. However, it will be evident that many of them can be performed in parallel, asynchronously, or in different orders.

Next, at step 86, a client request for a remote service is now formulated, and encoded according to the optimized protocol. Typically, an identification code is assigned to each allowable service and substituted for the conventional service identification. The parameter list of the individual services may also be encoded in a compressed format.

Control now passes to step 88, where the encoded information is transmitted from the client to the server.

Next, at step 90 at the server an encoded message is decoded. A remote service request is identified, together with any parameters. The request is reformulated in accordance with a standard protocol, for example SOAP.

Next, at step 92, the remote service identified in step 90 is accessed by the server using the standard protocol. The remote service may be provided on the same server as decoded the message, or on a different server.

Control now passes to decision step 94, where it is determined if there are more service requests to be encoded. If the determination at decision step 94 is affirmative, then control returns to step 90.

If the determination at decision step 94 is negative, then the results of the service requests submitted in step 92 are awaited and processed. Control proceeds to step 96, where all currently received results are encoded according to the optimized protocol. Typically, the identification code assigned to a particular service is substituted for the conventional service identification. The results obtained from each of the individual services are also encoded in compressed format.

Control proceeds to step 98, where the encoded information is transmitted from the server to the client.

Next, at step 100 at the client an encoded message is decoded. A remote service is identified in the message, together with the accompanying results.

Next, at step 102, the results that were decoded at step 100 are processed by client software. For example, they may be formatted and visually displayed.

Control now passes to decision step 104, where it is determined if there are more service requests to be encoded. If the determination at decision step 104 is affirmative, then control returns to step 100.

If the determination at decision step 104 is negative, then control proceeds to final step 106, and the process terminates.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of client/server communication comprising the steps of:
   identifying characteristics of a client and a predetermined service to be obtained for said client from an application server, said client being a thin client operating in a first platform-independent environment, said application server operating in a second platform-independent environment;
   responsively to determining said characteristics of said client and said predetermined service, and external to said client:
      automatically compiling a client program for said client from a platform-independent source code,
      automatically defining a first message format for use by said client program that is optimized according to said characteristics and said predetermined service, and
      automatically generating a mediator program corresponding to the client program, said mediator program being adapted to process messages encoded in said first message format;
   sending said client program to said client;
   wherein said client program enables said client to generate a request for said predetermined service and encode said request according to said first message format to define an encoded message;
   receiving said encoded message from said client at a mediator server disposed external to said client;
   executing said mediator program in said mediator server to re-encode said encoded message into a second message format that is acceptable to said predetermined service of said application server to define a re-encoded message, wherein a size of said re-encoded message exceeds a size of said encoded message; and
   transmitting said re-encoded message to a provider of said predetermined service,
   wherein said client program is compiled from application of input data to a predefined template, wherein said template includes data and a logic specific to at least one of said client or said predetermined service and
   wherein said mediator program corresponding to said client program is generated responsively to said predefined template.

2. The method according to claim 1, wherein said client program has only a minimum code that is required to produce said first message format.

3. The method according to claim 1, wherein said step of executing said mediator program comprises decoding said encoded message to define a decoded message, and re-encoding said decoded message into said second message format.

4. The method according to claim 1, wherein said request comprises a plurality of requests that are assembled into an encoded message group in said encoded message.

5. The method according to claim 4, further comprising the step of delaying performance of said step of encoding said request for a latency interval to await pendency of additional ones of said plurality of requests.

6. The method according to claim 4, wherein said plurality of requests are asynchronously initiated.

7. The method according to claim 1, wherein said second message format is SOAP.

8. A method of establishing access by a client to predetermined server-side services, comprising the steps of:
   identifying characteristics of said client and said predetermined services;
   external to said client, automatically defining a first protocol for use by said client that is optimized according to said characteristics of said client and said predetermined services;
   installing proxy code in said client that is customized responsively to said characteristics and said predetermined services to provide an interface with an application program executing therein, wherein requests for said predetermined server-side services are generated by said application program and said proxy code is adapted to reformulate said requests as first messages according to said first protocol, said client being a thin client;
   automatically generating said proxy code and sending said proxy code to said client for installation;
   automatically generating a mediator program corresponding to the proxy code that is operative for receiving messages according to said first protocol; and
   executing said mediator program in a computing device external to said client, said mediator program accepting input from said client according to said first protocol and being further adapted to reformulate said first messages as second messages according to a second protocol, said computing device being capable of communicating said second messages to a provider of said predetermined server-side services,
   wherein said proxy code is generated from application of input data to a predefined template, wherein said template includes data and a logic specific to at least one of said client or said predetermined service and
   wherein said mediator program corresponding to said proxy code is generated responsively to said predefined template.

9. The method according to claim 8, wherein said first messages are smaller than corresponding ones of said second messages.

10. The method according to claim 8, wherein said first messages each comprise a plurality of said requests.

11. The method according to claim 8, wherein said step of installing proxy code comprises automatically generating said proxy code.

12. The method according to claim 8, wherein said step of executing a mediator program comprises automatically generating said mediator program.

13. The method according to claim 8, wherein said second protocol is SOAP.

14. The method according to claim 8, further comprising the step of installing an API in said client for access by said application program.

15. The method according to claim 8, wherein said proxy code comprises a synchronous stub.

16. The method according to claim 8, wherein said proxy code comprises an asynchronous stub.

17. The method according to claim 8, wherein said proxy code comprises a grouped stub.

18. The method according to claim 8, wherein said proxy code comprises instructions for enablement of HTTP for transport of said first messages.

19. The method according to claim 8, wherein said proxy code comprises instructions for enablement of HTTPS for transport of said first messages.

20. The method according to claim 8, wherein said proxy code comprises no more than one procedure for accessing said predetermined server-side services.

21. A computer software product, comprising a non-transitory computer-readable medium in which computer program instructions are stored, which instructions, when read by a computer, cause the computer to perform a method of communication between a client operating in a first platform-independent environment and a server operating in a second platform-independent environment to obtain a predetermined service for said client via said server, comprising the steps of:
    accepting, as an input, characteristics of said client and an identification of said predetermined service, said client being a thin client;
    responsively to said characteristics of said client and said identification of said predetermined service, and external to said client, automatically compiling a client program for said client from a platform-independent source code, automatically defining a first message format for use by said client program that is optimized according to said characteristics and said predetermined service, and automatically generating a mediator program corresponding to the client program, said mediator program being adapted to accept said first format;
    sending said client program to said client;
    wherein said client program enables said client to encode a request for said predetermined service according to said first message format to define an encoded message;
    receiving said encoded message at a mediator server disposed external to said client;
    at said mediator server, executing said mediator program for re-encoding said encoded message into a second message format to define are-encoded message, wherein a size of said re-encoded message exceeds a size of said encoded message; and
    transmitting said re-encoded message to a provider of said predetermined service,
    wherein said client program is compiled from application of input data to a predetermined template, wherein said template includes data and a logic specific to at least one of said client or said predetermined service and
    wherein said mediator program corresponding to said client program is generated responsively to said predefined template.

22. The computer software product according to claim 21, wherein said step of re-encoding said encoded message is performed by decoding said encoded message to define a decoded message; and re-encoding said decoded message into said second format.

23. The computer software product according to claim 21, wherein said request comprises a plurality of requests that are assembled into an encoded message group in said encoded message.

24. The computer software product according to claim 23, wherein said computer is further instructed to delay performance of said step of encoding a request for a latency interval to await pendency of additional ones of said plurality of requests.

25. The computer software product according to claim 23, wherein said plurality of requests are asynchronously initiated.

26. The computer software product according to claim 21, wherein said second format is SOAP.

27. A computer software product, comprising a non-transitory computer-readable medium in which computer program instructions are stored, which instructions, when read by a computer, cause the computer to perform a method of establishing access by a client operating in a first platform-independent environment to a server operating in a second platform-independent environment to obtain predetermined server-side services, comprising the steps of:
    accepting, as input, characteristics of said client and said predetermined services, said client being a thin client;
    automatically generating proxy code for installation in said client to provide an interface with an application program executing therein, wherein requests for said predetermined server-side services are generated, by said application program and said proxy code is adapted to reformulate said requests as first messages according to a first protocol, wherein said instructions cause the computer to configure said first protocol according to said characteristics of said client and said predetermined server-side services for use by said user; and
    sending said proxy code to said client; and
    responsively to said characteristics and said predetermined services, automatically generating a mediator program corresponding to the proxy code for installation in a computing device external to said client, said mediator program accepting input from said client according to said first protocol and being further adapted to reformulate said first messages as second messages according to a second protocol, said computing device being capable of communicating said second messages to a provider of said predetermined server-side services,
wherein said proxy code is generated from application of input data to a predefined template,
    wherein said template includes data and a logic specific to at least one of said client or said predetermined service, and
    wherein said mediator program corresponding to said proxy code is generated responsively to said predefined template.

28. The computer software product according to claim 27, wherein said application program has only a minimum protocol generation code that is required to produce said first messages in said first protocol.

29. The computer software product according to claim 27, wherein said first messages are smaller than corresponding ones of said second messages.

30. The computer software product according to claim 27, wherein said first messages each comprise a plurality of said requests.

31. The computer software product according to claim 27, wherein said second protocol is SOAP.

32. The computer software product according to claim 27, further comprising the step of installing an API in said client for access by said application program.

33. The computer software product according to claim 27, wherein said proxy code comprises a synchronous stub.

34. The computer software product according to claim 27, wherein said proxy code comprises an asynchronous stub.

35. The computer software product according to claim 27, wherein said proxy code comprises a grouped stub.

36. The computer software product according to claim 27, wherein said proxy code comprises instructions for enablement of HTTP for transport of said first messages.

37. The computer software product according to claim 27, wherein said proxy code comprises instructions for enablement of HTTPS for transport of said first messages.

38. The computer software product according to claim 27, wherein said proxy code comprises no more than one procedure for accessing said predetermined server-side services.

39. A computer software product, comprising a non-transitory computer-readable medium in which computer program instructions are stored, which instructions, when read by a computer, cause the computer to perform a method of establishing an interaction between a client operating in a first platform-independent environment to a server operating in a second platform independent environment over a data network to obtain a supported predetermined service for said client via said server, comprising the steps of:
identifying characteristics of said client and identifying said predetermined service, said client being a thin client;
external to said client, responsively to said characteristics and said predetermined service, automatically generating a first program for installation in said client, which when executed by said client causes said client to perform the steps of:
encoding a request for said predetermined service according to a first format to define an encoded message, said first format being defined and configured in said first program responsively to said characteristics of said client and said predetermined services; and
transmitting said encoded message to said server via said data network; and
sending said first program to said client;
automatically generating a second program corresponding to said first program for installation in said server, said second program being adapted to accept said first format, wherein said second program, when executed by said server causes said server to perform the steps of:
re-encoding said encoded message into a second format to define a re-encoded message, wherein a size of said re-encoded message exceeds a size of said encoded message; and
transmitting said re-encoded message to a provider of said predetermined service via said data network,
wherein said first program is generated from application of input data to a predefined template,
wherein said template includes data and a logic specific to at least one of said client and said predetermined service and
wherein said second program corresponding to said first program is generated responsively to said predefined template.

40. The computer software product according to claim 39, wherein said step of re-encoding said encoded message is performed by decoding said encoded message to define a decoded message; and re-encoding said decoded message into said second format.

41. The computer software product according to claim 39, wherein said request comprises a plurality of requests that are assembled into an encoded message group in said encoded message.

42. The computer software product according to claim 41, wherein said client is further instructed to delay performance of said step of encoding a request for a latency interval to await pendency of additional ones of said plurality of requests.

43. The computer software product according to claim 41, wherein said plurality of requests are asynchronously initiated.

44. The computer software product according to claim 39, wherein said second format is SOAP.

45. A development system for establishing access by a client to predetermined server-side services, comprising:
a computer having a code generator executing therein within a first platform-independent environment, said code generator being configured to (1) accept as an input characteristics of said client and said predetermined server-side services, said client being a thin client, and to (2) external to said client, automatically generate proxy code executable in said client to provide an interface with an application program executing in said client and to send the proxy code to said client, said proxy code being configured responsively to said characteristics and said predetermined server-side services, wherein requests for said predetermined server-side services are generated by said application program and said proxy code is adapted to reformulate said requests as first messages according to a first protocol, wherein said client operates in a second platform-independent environment; and
said code generator being further adapted to automatically generate a mediator program corresponding to said proxy code for a computing device external to said client, said mediator program accepting input from said client according to said first protocol and being further adapted to reformulate said first messages as second messages according to a second protocol, said computing device being capable of communicating said second messages to a provider of said predetermined server-side services,
wherein said proxy code is generated from application of input data to a predefined template, wherein said template includes data and a logic specific to at least one of said client or said predetermined service and
wherein said mediator program corresponding to said proxy code is generated responsively to said predefined template.

46. The development system according to claim 45, wherein said code generator is actuated using a command line interface.

47. The development system according to claim 45, wherein said code generator is linked to an integrated development program.

48. The development system according to claim 45, wherein said first messages are smaller than corresponding ones of said second messages.

49. The development system according to claim 45, wherein said first messages each comprise a plurality of said requests.

50. The development system according to claim 45, wherein said second protocol is SOAP.

51. The development system according to claim 45, wherein said proxy code comprises proxy classes.

52. The development system according to claim 45, wherein said proxy code comprises a synchronous stub.

53. The development system according to claim 45, wherein said proxy code comprises an asynchronous stub.

54. The development system according to claim 45, wherein said proxy code comprises a grouped stub.

55. The development system according to claim 45, wherein said proxy code comprises instructions for enablement of HTTP for transport of said first messages.

56. The development system according to claim 45, wherein said proxy code comprises instructions for enablement of HTTPS for transport of said first messages.

57. The development system according to claim 45, wherein said proxy code comprises no more than one procedure for accessing said predetermined server-side services.

* * * * *

UNITED STATES PATENT AND TRADEMARK OFFICE
CERTIFICATE OF CORRECTION

| | |
|---|---|
| PATENT NO. | : 8,775,649 B2 |
| APPLICATION NO. | : 10/303805 |
| DATED | : July 8, 2014 |
| INVENTOR(S) | : Blaukopf et al. |

Page 1 of 1

It is certified that error appears in the above-identified patent and that said Letters Patent is hereby corrected as shown below:

In the Specification

Column 9, line 16, delete "http://www.example.com/services/mediator";" and insert -- {Insert URL here}; --, therefor.

Column 10, line 20, delete "to," and insert -- to --, therefor.

Column 12, lines 29-30, delete ""http: // schemas.xmlsoap.org/soap/envelope/"" and insert -- {Insert URL here} --, therefor.

Column 12, lines 31-32, delete ""http://www.w3.org/1999/XMLSchema- instance"" and insert -- {Insert URL here} --, therefor.

Column 12, line 33, delete ""http://www.w3.org/1999/XMLSchema">" and insert -- {Insert URL here} --, therefor.

Column 12, line 44, delete ""http://schemas.xmlsoap.org/soap/envelope/"" and insert -- {Insert URL here} --, therefor.

Column 12, line 45, delete ""http://www.w3.org/1999/XMLSchema- instance"" and insert -- {Insert URL here} --, therefor.

Column 12, line 46, delete ""http://www.w3.org/1999/XMLSchema">" and insert -- {Insert URL here} --, therefor.

In the Claims

Column 18, line 44, Claim 27, delete "user;" and insert -- client; --, therefor.

Signed and Sealed this
Tenth Day of February, 2015

Michelle K. Lee
*Deputy Director of the United States Patent and Trademark Office*

UNITED STATES PATENT AND TRADEMARK OFFICE
CERTIFICATE OF CORRECTION

PATENT NO.       : 8,775,649 B2
APPLICATION NO.  : 10/303805
DATED            : July 8, 2014
INVENTOR(S)      : Blaukopf et al.

Page 1 of 1

It is certified that error appears in the above-identified patent and that said Letters Patent is hereby corrected as shown below:

In the Claims

Column 18, line 25, Claim 27, delete "non-transitory";
Column 18, line 44, Claim 27, delete "use" and insert "used";
Column 19, line 27, Claim 39, delete "non-transitory".

Signed and Sealed this
Twenty-second Day of September, 2015

Michelle K. Lee
*Director of the United States Patent and Trademark Office*